United States Patent
Bühler

(10) Patent No.: US 6,528,560 B2
(45) Date of Patent: Mar. 4, 2003

(54) COLORLESS, HIGHLY TRANSPARENT POLYAMIDE BLENDS WITH IMPROVED STRESS CRACKING RESISTANCE

(75) Inventor: Friedrich Severin Bühler, Thusis (CH)

(73) Assignee: EMS-Chemie AG, Domat/EMS (CH)

( * ) Notice: Subject to any disclaimer, the term of this patent is extended or adjusted under 35 U.S.C. 154(b) by 21 days.

(21) Appl. No.: 09/796,907

(22) Filed: Feb. 28, 2001

(65) Prior Publication Data

US 2001/0031805 A1 Oct. 18, 2001

(30) Foreign Application Priority Data

Mar. 1, 2000 (DE) .......................... 100 09 756

(51) Int. Cl.[7] .................. C08K 5/34; C08K 5/49; C08K 5/53
(52) U.S. Cl. .................. 524/123; 524/99; 524/102; 524/117; 524/126
(58) Field of Search .................. 524/123, 126, 524/99, 102, 117

(56) References Cited

U.S. PATENT DOCUMENTS

| | | | |
|---|---|---|---|
| 4,404,317 A | | 9/1983 | Epstein et al. |
| 4,788,259 A | * | 11/1988 | Nielinger et al. ........... 524/420 |
| 5,290,836 A | * | 3/1994 | Truyen ..................... 524/123 |
| 5,886,087 A | | 3/1999 | Dalla Torre |

FOREIGN PATENT DOCUMENTS

| | | |
|---|---|---|
| DE | 2150678 | 4/1973 |
| DE | 26 42 244 | 3/1977 |
| DE | 3821325 | 12/1989 |
| EP | 0 070 001 | 1/1983 |
| EP | 0 659 836 | 12/1994 |
| EP | 0 509 282 B1 | 7/1996 |
| EP | 0 550 308 B1 | 6/1998 |
| EP | 0 720 631 | 10/1998 |
| GB | 1019348 | 2/1966 |
| JP | 60-215053 | 10/1985 |
| JP | 60-215054 | 10/1985 |

* cited by examiner

Primary Examiner—Kriellion A. Sanders
(74) Attorney, Agent, or Firm—Bell, Boyd & Lloyd LLC

(57) ABSTRACT

Polyamide mixtures (blends) or alloys having improved transparency, chemical resistance and slight natural color, as well as a process improving the melting capacity and homogeneity of blends of polyamide according to formula (I) and partly crystalline polymers according to formula (II). Transparent polyamide blends are obtained which exhibit improved properties with respect to transparency, color, and chemical resistance, in particular stress cracking resistance against isopropanol, without resulting losses in the mechanical properties. At the same time it was possible to distinctly raise the throughput during extrusion while maintaining optimum transparency.

20 Claims, No Drawings

COLORLESS, HIGHLY TRANSPARENT POLYAMIDE BLENDS WITH IMPROVED STRESS CRACKING RESISTANCE

FIELD OF INVENTION

The present invention concerns colorless, highly transparent polyamide mixtures (blends) or alloys with improved transparency, chemical resistance, and slight natural color, as well as a process improving the melting capacity and homogeneity of blends consisting of polyamide according to formulas Ia/Ib and partly crystalline polyamides according to formulas IIa/IIb. On the basis of the compositions according to the invention, transparent polyamide blends are obtained which in terms of transparency, color, chemical resistance, particularly stress cracking resistance against isopropanol, exhibit improved properties without resulting losses in the mechanical properties. At the same time a distinct increase in extrusion throughput could be achieved while maintaining optimum transparency.

BACKGROUND OF THE INVENTION

Amorphous or partly crystalline polyamides, copolyamides or block co-polyamides are employed in numerous technical applications requiring high chemical resistance, dimensional stability under heat, toughness, and strength. Typical processing shapes are fibers, sheeting, hollow articles, thermoplastic adhesives, and injection-molded technical materials. In numerous cases highly transparent materials are required, as for instance for automotive lights, viewing panels, spectacle frames, optical lenses and glass, filter cups, electrical components, optical wave guides, display windows, sight glasses, wrapping films, bottles and containers. The prominent property is chemical resistance against liquids used in automotive applications.

Suitable properties of homopolyamides, copolyamides, or block copolyamides often are tuned through monomer fractions such as lactams or amino acids, diamines and dicarboxylic acids and produced by processes such as cocondensation. Partly crystalline polyamides often are combined and tuned to the desired property profile in the form of polyamide blends by mixing or alloying in the molten state, and depending on requirements supplemented by reinforcing agents, stabilizers such as phenolic antioxidants and HALS types, dyes, processing aids, flame retardants.

In most cases, transparent amorphous or transparent microcrystalline polyamides, copolyamides or block copolyamides are produced by direct cocondensation, as mentioned earlier, while selecting the individual monomer fractions in such a way that the desired target properties are obtained and crystallization is suppressed or adjusted to a microcrystallite form.

The preparation of transparent polyamide blends is complicated by the fact that one must combine, either miscible or isorefractive polyamides. Polyamides which are not miscible or isorefractive can only be mixed or alloyed to a transparent product if by compatibilizers, high mixing temperatures or forced mechanical mixing at low machine throughputs the particle size of the phases can be reduced to less than the scattering size for visible light. The additional extrusion step causes the products to be more expensive than those of direct condensation, and hence is rarely employed for transparent polyamides.

An improved chemical resistance for instance when desired for amorphous polyamides can be achieved by the known method of cocondensation, for instance by the incorporation of long-chain aliphatic monomers such as amino acids diamines, or dicarboxylic acids having more than six carbon atoms or of lactams having 6 to 12 carbon atoms.

Improved chemical resistance as characterized by reduced swelling in ethanol can be attained by producing blends of amorphous polyamides with partly crystalline polyamides via an extrusion step (see DE 2,642,244 C2).

An optimum stress cracking resistance, for instance in isopropanol, can be attained when a particular melting enthalpy of the partly crystalline component is retained in the blend.

It is a disadvantage that this will alter the basic properties of the amorphous polyamide, and that the transparency is reduced by the dispersed phase that is signaled by the melting enthalpy. It is a further disadvantage that depending on the mixing effect of the forming process, the melting enthalpy will be reduced and thus the chemical resistance in terms of stress cracking resistance will decrease.

JP 60-215,053 and 60-215,054 (Kokai) describe blends of transparent polyamides built up from lactams, amino carboxylic acids, cycloaliphatic diamine (bis-(4-aminocyclohexyl)methane), isophthalic acid, and partly crystalline aliphatic polyamides. It is known that longer residence times (lower throughput) is required in the extruder in order to obtain transparent material from these mixtures. Opaque products are obtained at optimum throughputs. The additional extrusion increases the yellow tinge of the products.

In EP 0,070,001 (Du Pont), blends of partly crystalline and amorphous polyamides are described. These amorphous polyamides in addition contain cycloaliphatic diamines for applications with low humidity uptake and good $ZnCl_2$ resistance. However, these blends are not always transparent. According to EP 0 070 001, phenylphosphinate is employed as heat stabilizer.

According to U.S. Pat. No. 4,404,317 (Du Pont), the temperature of the mass should not be above 300° C. when extruding blends of amorphous and partly crystalline polyamides in order to obtain optimum color and low decomposition. No information is given relative to chemical resistance and stress cracking behavior.

EP 550,308 B1 describes that extrusion temperatures higher than 300° C. are required in order to obtain transparent polyamide blends from polyamide according to formula (I) in that patent and partly crystalline polyamides, since the miscibility is limited at low temperatures and leads to opaque products. The target products should not exhibit any melting enthalpy of the partly crystalline phase in order to obtain optimum transparency. This high thermal stress leads to distinct discoloration of the products. The improved chemical resistance is reported in terms of reduced swelling tendency in ethanol. The reduced swelling tendency in ethanol is attributed to the fact that the terephthalic acid fraction prevails relative to the isophthalic acid fraction. No information is given as to stress cracking behavior, for instance in isopropanol.

Further, a procedure is described in EP 550,308 B1 according to which phosphorus compounds are used as transamidation catalysts in order to produce a post condensation in the extruder. Optionally, in this case a low-viscosity polyamide precondensate is used and extruded together with a second polyamide. Post condensation in the extruder requires vacuum to be applied during extrusion, and leads to higher viscosity of the blend. This type of post condensation requires low throughputs and long residence times, which has negative consequences for the color. Examples referring to this process variant are not provided. Advantages in terms of chemical resistance or stress cracking behavior are not cited.

EP 0,720,631 B1 describes special phosphorus compounds being used as amidation catalysts that can be added as a master batch to polyamide 66 when producing fibers. Adding this master batch to the polyamide melt while producing fibers leads to fibers having a higher molecular weight and higher viscosity but lower gel fraction. The behavior in amorphous polyamides is not reported. The resistance against chemicals and the stress cracking behavior are not described. A disadvantage of these polyamide blends is the higher viscosity, which impairs the fluidity behavior during the processing by injection molding.

In EP 509,282 B1 and DE 3,821,325 A1, phosphorus compounds are proposed as processing stabilizers improving the color of partly crystalline polyamide compounds. The behavior in transparent and amorphous polyamide blends is not described. No information is given as to chemical resistance and stress cracking behavior.

It is an advantage of the present invention, therefore, to avoid at least some of the above disadvantages of the above.

SUMMARY OF THE INVENTION

Surprisingly, it has now been found according to the invention that with the aid of phosphorus compounds added during extrusion to the blend components consisting, for instance, of amorphous and partly crystalline polyamides, one obtains highly transparent polyamide blends with improved stress cracking resistances in isopropanol (>60 MPa) because of a very low melting enthalpy (of less than 8 J/g; see examples B4, B6), even when working with high machine throughputs enabling short residence times.

Despite short residence times a homogeneous, transparent material is obtained according to the invention which exhibits, neither degradation nor polymerization or discoloration but excellent transparency when using extrusion temperatures of 250 to 330° C.

For the blends according to the invention, swelling in ethanol is in the range from about 18 to 20 weight percent, regardless of whether the polyamide I according to formulas Ia/Ib has an excess of terephthalic over isophthalic acid or does not contain any terephthalic acid as the acid component.

Relative to polyamide blends produced without the phosphorus compounds that are employed according to the invention, the stress cracking resistance of the blends according to the invention, for instance in isopropanol, will remain on a high level, even when the PA 12 melting peak of the partly crystalline component limiting the transparency is no longer present (see examples B8, VB9, Table 1).

The chemical resistance when stated in terms of swelling in ethanol reveals no differences between blends with and without phosphorus compounds.

The viscosity of the blends according to the invention remains low while a post condensation which would limit the fluidity in subsequent processing by injection molding does not occur. According to the invention, improved welded joint strengths as compared to blends without phosphorus compounds are found.

The chemical resistance of the blends according to the invention, for instance in terms of stress cracks in isopropanol, is distinctly higher than that of cocondensate produced in a direct way (see example VB1, Table 1) and containing exactly the same components in the same proportions. Blends according to the invention exhibit a distinctly lower swelling in ethanol.

When using phosphorus compounds, it is possible in particular to produce transparent blends which without phosphorus compounds require high extrusion temperatures (>300° C.) in order to attain the desired transparency through sufficient homogenization, or require long residence times with low throughput and thus have a discoloration tendency. With the molding materials according to the invention, the melting and mixing effect in polyamides during compounding is almost doubled, the thermal damage is distinctly reduced. The stabilizing effect is retained during subsequent forming, so that products with distinctly improved properties with respect to transparency and color are generated.

In contrast to blends without phosphorus compounds, the chemical resistance exhibited by the molding materials according to the invention in terms of stress cracking resistance in isopropanol is retained, even when achieving optimum homogeneity, so that the partly crystalline phase no longer exhibits melting enthalpy while the swelling behavior in ethanol remains unchanged.

Additional features and advantages of the present invention will be described in and apparent from the detailed description of the presently preferred embodiments and the figures.

DETAILED DESCRIPTION OF THE INVENTION

The polyamide blends according to the invention contain at least one polyamide (I) having chains according to the composition given by formulas Ia/Ib and at least one partly crystalline polyamide (II) having chains according to formulas IIa/IIb. The fractions of polyamide (I) and polyamides (II) are employed in ratios between 1:99 and 99:1, preferably between 10:90 and 90:10, so that the sum yields 100 weight percent.

As a further component, at least one phosphorus compound of formula (III) is added in amounts between 0.01 and 2 parts relative to 100 parts of polyamide (I) and/or (II), and/or at least one phosphonic acid anhydride compound of formula (IV) in amounts between 0.01 and 15 parts relative to 100 parts of polyamide (I) and/or (II), which at the same time yields a flame retarding effect. The phosphorus compounds according to formula (III) or (IV) can of course be employed in the form of mixtures.

Optionally, one or more of the usual stabilizers can be added in amounts of up to 2 parts by weight, relative to 100 parts by weight of polyamide.

To the polyamide blends according to the invention, one can of course add fillers and reinforcing agents, flame retardants, plasticizers, lubricants, antioxidants, UV stabilizers, dyes, processing aids, and other known finishing agents.

The polyamide (I) comprises the following chains (Ia) and/or (Ib):

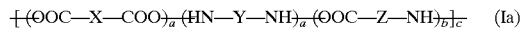

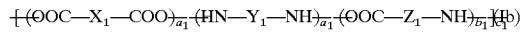

where
  X=meta-phenyl, para-phenyl, $(CH)_2$: 4 to 12 $CH_2$ units, cyclohexyl, naphthyl, norbornyl, norbornane-dimethyl, trimethyl-hexamethylene,
  $X_1$=meta-phenyl, para-phenyl, $(CH)_2$: 2 to 12 $CH_2$ units, cyclohexyl, naphthyl, norbornyl, norbornane-dimethyl, trimethyl-hexamethylene, Y=(CH$_2$): 2 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis-(cyclohexyl)ethane, bis(cyclohexyl)propane, Y$_1$=(CH$_2$): 2 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis(cyclohexyl)ethane, bis(cyclohexyl)propane, Z=(CH$_2$): 4 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, Z$_1$=(CH$_2$): 4 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene and a=0 to 50 mol %, b=0 to 100 mol % a$_1$=0 to 50 mol %, b$_1$=0 to 100 mol %.

The sum a+a$_1$+b+b$_1$ gives 100 mol %. The sum c+c$_1$ gives 100 wt. %.

The complete polyamide (I) as a rule has 30 to 150 chain units, depending on the monomer units selected.

The partly crystalline polyamide (II) has the following chains according to formulas IIa and/or IIb:

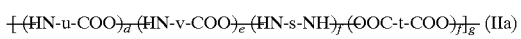

(IIa)

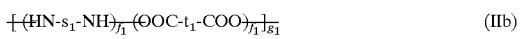

(IIb)

where u=(CH$_2$): 4 to 12 CH$_2$ units, v=(CH$_2$): 4 to 12 CH$_2$ units, s, s$_1$=(CH$_2$): 2 to 12 CH$_2$ units, meta-phenyl, para-phenyl, t, t$_1$=(CH$_2$): 2 to 12 CH$_2$ units, meta phenyl, para phenyl, f=0 to 50 mol %, d=0 to 100 mol %, f$_1$=0 to 50 mol %, e=0 to 100 mol %. P The sum g+g$_1$ gives 100 weight %.

The phosphorus compounds according to formula (III) can be added in the pure state or as an aqueous solution during extrusion of the blend components:

[X(R')$_n$P(O)$_l$(OR")$_m$]   (III)

where

X=H, —OR", 2-pyridyl, —NH$_2$, —NHR', —NR'R" where X can be bonded to (R') or directly to P, R'=(CH$_2$)$_{n_1}$ linear or branched, R"=Li, Na, K, H, (CH$_2$)$_{n_2}$ linear or branched, n=integer between 0 and 5; l=0, 1, 1.5, 2, 2.5; m=integer between 0 and 3, n$_1$=integer between 1 and 12, n$_2$=1 to 12.

The complete polyamide (II) as a rule has 100 to 500 chain units, depending on the monomer units selected.

Cyclic phosphonic acid anhydride compounds according to formula (IV) can also be added in the pure state or as an aqueous solution during extrusion of the blend components:

(IV)

where n=3, 4, 5, 6, alternating —P—O— heterocycle with 3, 4, 5, 6 (P—O) units in the ring, R=CH$_3$, C$_2$H$_5$, C$_3$H$_7$, C$_4$H$_9$, isobutyl, 2,2,6,6-tetramethyl-4-piperidyl.

Mixtures of the phosphorus compounds can of course also be employed.

Suitable methods for producing the polyamide blends according to the invention are all known extrusion methods, provided that extrusion temperatures resulting in mold temperatures betwen 250 and 330° C. are applied.

Suitable processing methods for the polyamide blends according to the invention are thermoplastic processing methods which yield injection-molded parts, sheeting, plates, fibers, pipes, hollow articles, rods at temperatures of 200 to 350° C.

Suitable applications for molded parts, sheeting, fibers, tubing, rods, and coatings consisting of the polyamide blends according to the invention are spectacles, lenses, lamps, mirrors, panes, sight glasses, optical components, fittings, bottles, containers, medical, cosmetic and hygiene articles, tooth-brushes, handles, packaging, fashion jewelry, backing films, laminated films, coextruded films, plates, semifinished goods, cylindrical preforms, optical wave guides, optical fibers, cable sheathing, pipes and conduits or protective coatings, varnishes and coatings for wires, grids, baskets, metal sheet, magnetic coils and deflection coils produced from solution.

The invention will now be explained in greater detail with the aid of the following examples, but without being limited to them. In Table 1 the values obtained for the mechanical and optical properties are confronted.

REFERENCE EXAMPLE 1 (COPOLYAMIDE ACCORDING TO FORMULA I)

While flushing with nitrogen, 19.3 kg laurolactam, 9.4 kg bis(4-amino-3-methyl-cyclohexyl)methane (mixture of isomers), and 6.3 kg isophthalic acid are introduced with 9.5 kg water into a 130-liter pressure autoclave. The mixture is then heated to 300° C. within one hour, and stirred for four hours while applying a pressure of 20 to 30 bars. Then the pressure is relieved to 1 bar, the temperature lowered to 280° C. and degassing allowed to occur for 1 to 2 h. When the target viscosity of 1.75 is attained, the melt is taken out, granulated, and dried for 24 h at 80° C. A transparent product having a glass transition temperature (T$_g$) of 111° C. and a relative viscosity of 1.75 (measured in a 0.5% solution in m-cresol) is obtained.

The product has medium transparency (see Table 1) and a very low stress cracking resistance in isopropanol. The swelling in ethanol is strong.

EXAMPLE 2 (POLYAMIDE-BLEND (I)/(II) 100/0 WEIGHT PERCENT)

While flushing with nitrogen, 10.0 kg laurolactam, 11.76 kg bis(4-amino-3-methyl-cyclohexyl)methane (BASF, mixture of isomers), and 8.0 kg isophthalic acid are introduced with 8 kg water into a 130-liter pressure autoclave. Like Reference example 1. A transparent product with T$_g$=167° C. and a relative viscosity of 1.56 (measured in 0.5% solution in m-cresol) is obtained.

The product exhibits very high transparency, slight discoloration, and a very slight stress cracking resistance against isopropanol. The swelling in ethanol is very strong.

REFERENCE EXAMPLE 3 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol) in a double-screw extruder ZSK30 of the firm Werner & Pfleiderer. The mold temperature is 294° C., the mold pressure 8 bars at 100 rpm. The throughput is 5 kg/h at a relative torque of 50–55%. The extruded material is cooled in a water bath and granulated. Then the granules are dried for 24 h at 90° C.

The product has very low homogeneity (melting enthalpy=10.0 J/g), medium transparency, and a very strong discoloration for low throughputs. The stress cracking resistance against isopropanol is high. The swelling in ethanol is low.

EXAMPLE 4 (POLYAMIDE BLEND OF POLYAMIDE ACCORIDNG TO FORMULAS Ia/Ib and POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol), mixed with 0.2 wt. % $H_3PO_2$ (50%), in a double-screw extruder ZSK30 of the firm Werner & Pfleiderer. The mold temperature is 295° C., the mold pressure 8 bars at 100 rpm. The throughput is 5 kg/h at a relative torque of 55–60%. The extruded material is cooled in a water bath and granulated. Then the granules are dried for 24 h at 90° C.

The product has an ideal homogeneity (melting enthalpy=0 J/g), high transparency, and a very slight discoloration for low throughputs. The stress cracking resistance against isopropanol is high. The swelling in ethanol is low.

REFERENCE EXAMPLE 5 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol) in a double-screw extruder (twin-blade extruder) ZSK30 of the firm Werner & Pfleiderer. The mold temperature is 299° C., the mold pressure 10 bars at 200 rpm. The throughput is 10 kg/h at a relative torque of 60–65%. The extruded material is cooled in a water bath and granulated. Then the granules are dried for 24 h at 90° C.

The product has low homogeneity (melting enthalpy=8.0 J/g), medium transparency, and a strong discoloration for high throughputs. The stress cracking resistance against isopropanol is slightly reduced. The swelling in ethanol is low.

EXAMPLE 6 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol), mixed with 0.2 wt. % $H_3PO_2$ (50%), in a double-screw extruder ZSK30 of the firm Werner & Pfleiderer. The mold temperature is 297° C., the mold pressure 10 bars at 200 rpm. The throughput is 10 kg/h at a relative torque of 65–75%. The extruded material is cooled in a water bath and granulated. Then the granules are dried for 24 h at 90° C.

The product has an ideal homogeneity (melting enthalpy=0 J/g), very high transparency, and a very slight discoloration for high throughputs. The stress cracking resistance against isopropanol is high. The swelling in ethanol is low.

EXAMPLE 7 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol), mixed with 0.2 wt. % $H_3PO_2$ (50%), in a double-screw extruder ZSK30 of the firm Werner & Pfleiderer. The mold temperature is 249° C., the mold pressure 10 bars at 200 rpm. The throughput is 10 kg/h at a relative torque of 58%. The extruded material is cooled in a water bath and granulated. Then the granules are dried for 24 h at 90° C.

The product has a low homogeneity (melting enthalpy= 8.2 J/g), low transparency, and slight discoloration for high throughputs. The stress cracking resistance against isopropanol is high. The swelling in ethanol is low.

EXAMPLE 8 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol), mixed with 0.2 wt. % $H_3PO_2$ (50%), in a double-screw extruder ZSK58 of the firm Werner & Pfleiderer. The mold temperature is 300° C., the mold pressure 16 bars at 200 rpm. The throughput is 90 kg/h at a relative torque of 30%. The extruded material is cooled in a water bath and granulated. Then the granules are dried for 24 h at 90° C.

The product has a high homogeneity (melting enthalpy=0 J/g), high transparency, and medium discoloration. The stress cracking resistance against isopropanol is high. The swelling in ethanol is low.

REFERENCE EXAMPLE 9 (POLYAMIDE BLEND OF POLYAMIDE ACCORDING TO FORMULAS Ia/Ib AND POLYAMIDE ACCORDING TO FORMULAS IIa/IIb: 70/30 WT. %)

Seventy weight percent of the polyamide product of example 2 are extruded together with 30 wt. % of polyamide 12 (partly crystalline polymer according to formula(II): melting point 175° C., relative viscosity 2.3 (measured in 0.5% solution in m-cresol) in a double-screw extruder ZSK58 of the firm Werner & Pfleiderer. The mold temperature is 333° C., the mold pressure 14 bars at 200 rpm. The throughput is 80 kg/h at a relative torque of 33%. The extruded material is cooled in a water bath and granulated. Then the granules are dried for 24 h at 90° C.

The product has ideal homogeneity (melting enthalpy=0 J/g), medium transparency, and a very strong discoloration. The stress cracking resistance against isopropanol is slight. The swelling in ethanol is low.

192 h at room temperature. The weight increase in wt. % of the original test body that occurs due to uptake of the swelling agent is measured.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

TABLE 1

| Examples | VB1 | B2 | VB3 | B4 | VB5 | B6 | B7 | B8 | VB9 |
|---|---|---|---|---|---|---|---|---|---|
| Polyamide blend (I)/(II) (wt. %) | — | 100/0 | 70/30 | 70/30 | 70/30 | 70/30 | 70/30 | 70/30 | 70/30 |
| Copolyamide (I) (wt. %) | 100 | | | | | | | | |
| Laurolactam (wt. %) | 55 | 34 | 54 | 54 | 54 | 54 | 54 | 54 | 54 |
| $H_3PO_2$ 50% (wt. %) | 0 | 0 | 0 | 0.2 | 0 | 0.2 | 0.2 | 0.2 | 0 |
| Extr. temp. (° C.) | — | — | 294 | 295 | 299 | 297 | 249 | 300 | 333 |
| Throughput (kg/h) | — | — | 5 | 5 | 10 | 10 | 10 | 90 | 80 |
| $T_g$ (° C.) | 111 | 167 | 121 | 116 | 119 | 115 | 117 | 121 | 116 |
| Melting enthalpy (J/g) | — | — | 10.0 | 0 | 8.0 | 0' | 8.2 | 0 | 0 |
| Impact strength (notched) at −30° C. (kJ/m$^2$) | 8.6 | 7.8 | 8.2 | 8.1 | 7.5 | 7.9 | 8.9 | 7.4 | 7.5 |
| Young's modulus (MPa) | 1800 | 2100 | 2000 | 1900 | 2000 | 1900 | 2000 | 1900 | 1900 |
| Transparency (%) | 83 | 90 | 83 | 88 | 81 | 90 | 79 | 87 | 83 |
| YI/ASTMD1925/ 9 mm | 12 | 8 | 24 | 6 | 21 | 4 | 11 | 12 | 26 |
| Stress cracks (MPa) | 17 | 20 | >80 | >80 | 70 | >80 | >80 | >80 | 20 |
| Swelling EtOH (wt. %) | 36.3 | 42.2 | 19.2 | 18.5 | 19.1 | 18.6 | 19.0 | 18.6 | 19.5 |

VB=Reference example
B=Example, according to invention
YI=Yellow index
EtOH=Ethanol
Extr. temp.=Mold temperature of extruded material
Methods of measurement used $T_g$ (the glass transition temperature) and the melting enthalpy were determined for the dry granules with a DSC instrument (Model Universal V2.4F of Thermo Analysis Instruments) with a heating rate of 20° C./min. (Pretreatment of the samples: drying at 90° C. during 24 h.)

The impact strength (notched) was determined at dry test bodies at −30° C. using Charpy's method (ISO 179/1eA).

The transparency was determined via light transmission at 540 nm in a Perkin Elmer UV spectrometer using 3 mm color platelets.

The (tensile) Young's modulus is determined with tension rods according to DIN (German standard) in the dry state using a strain rate of 1 mm/min, according to ISO 527.

The Yellow index was determined according to ASTM D 1925 using three superimposed color platelets (3 mm each).

For a determination of stress cracking resistance, DIN (German standard) tension bars are subjected to different bending stresses, and immersed for 60 s into isopropanol. The bending stress is indicated at which a fracture occurs within 60 s.

Swelling is measured in 95% technical-grade ethanol, with DIN (German standard) tension bars stored for

What is claimed is:

1. A colorless, highly transparent polyamide composition comprising:

1 to 99 wt. % of a polyamide (I), including at least one chain selected from the group consisting of the formulas Ia and Ib:

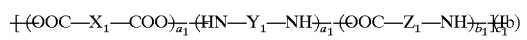

wherein

X=meta-phenyl, para-phenyl, (CH)$_2$: 4 to 12 CH$_2$ units, cyclohexyl, naphthyl, norbornyl, norbornane-dimethyl, trimethyl-hexamethylene, X$_1$=meta-phenyl, para-phenyl, (CH)$_2$: 2 to 12 CH$_2$ units, cyclohexyl, naphthyl, norbornyl, norbornane-dimethyl, trimethyl-hexamethylene, Y=(CH$_2$): 2 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis-(cyclohexyl)ethane, bis(cyclohexyl)propane, Y$_1$=(CH$_2$): 2 to 12 CH$_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis-(cyclohexyl)ethane, bis(cyclohexyl)propane, $Z=(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, $Z_1=(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene and a=0 to 50 mol %, b=0 to 100 mol %, $a_1$=0 to 50 mol %, $b_1$=0 to 100 mol % and the sum $a+a_1+b+b_1$ provides 100 mol %, the sum $c+c_1$ provides 100 wt. %;

99 to 1 wt. % of a partly crystalline polyamide (II), including at least one chain selected from the group consisting of formulas IIa and IIb:

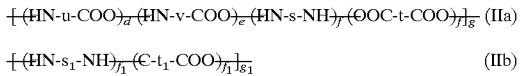

wherein $u=(CH_2)$: 4 to 12 $CH_2$ units, $v=(CH_2)$: 4 to 12 $CH_2$ units, $s, s_1=(CH_2)$: 2 to 12 $CH_2$ units, meta-phenyl, para-phenyl, $t, t_1=(CH_2)$: 2 to 12 $CH_2$ units, meta-phenyl, para-phenyl and f=0 to 50 mol %, d=0 to 100 mol %

$f_1$=0 to 50 mol %, e=0 to 100 mol %, where the sum $f+f_1+d+e$ provides 100 mol % and the sum $g+g_1$ provides 100 weight %; and at least 0.01 parts by weight, based on 100 parts by weight of the polyamides of formulas Ia/Ib, IIa/IIb, of at least one phosphorus compound, chosen from the group consisting of a phosphorous compound according to formula III:

$$[X(R')_n P(O)_l (OR'')_m] \quad (III)$$

wherein

X=H, —OR'', 2-pyridyl, —$NH_2$, —NHR', —NR'R'' where X can be bonded to (R') or directly to P, R'=$(CH_2)_{n_1}$ linear or branched, R''=Li, Na, K, H, $(CH_2)_{n_2}$ linear or branched, and n=integer between 0 and 5; l=0, 1, 1.5, 2, 2.5; m=integer between 0 and 3, $n_1$=integer between 1 and 12, $n_2$=1 to 12, and cyclic phosphonic acid anhydride compounds according to formula (IV),

wherein n=3, 4, 5, 6, is an alternating —P—O— heterocycle with 3, 4, 5, 6 (P—O) units in the ring, R=$CH_3, C_2H_5, C_3H_7, C_4H_9$, isobutyl, 2,2,6,6-tetramethyl-4-piperidyl.

2. The polyamide composition of claim 1 wherein the phosphorous compound is an aqueous solution.

3. The polyamide composition of claim 1 wherein the phosphorous compound is pure.

4. The polyamide composition of claim 1 wherein polyamide (I) comprises 10 to 90 weight % of the composition.

5. The polyamide composition of claim 1 wherein polyamide (II) comprises 10 to 90 weight % of the composition.

6. The polyamide composition of claim 1 wherein phosphorous composition (III) comprises 0.01 to 2.0 parts by weight, based on 100 parts by weight of polyamides Ia/Ib and IIa/IIb.

7. The polyamide composition of claim 1 wherein phosphorous composition (IV) comprises 0.01 to 15.0 parts by weight, based on 100 parts by weight of polyamides Ia/Ib and IIa/IIb.

8. The polyamide composition of claim 1 including at least one component chosen from the group consisting of fillers, reinforcing agents, flame retardants, plasticizers, lubricants, dyes, and processing aids.

9. The polyamide composition of claim 1 including up to 2 parts by weight of stabilizers, based on 100 parts per weight of polyamide.

10. The polyamide composition of claim 1 wherein the composition has a high stress cracking resistance against isopropanol (>60 MPa) and an ideal homogeneity (very low melting enthalpy of less than 8 J/g).

11. A process for producing a polyamide composition comprising the steps of:

providing a composition including 1 to 99 wt. % of a polyamide (I), including at least one chain selected from the group consisting of the formulas Ia and Ib:

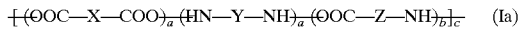
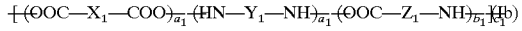

wherein

X=meta-phenyl, para-phenyl, $(CH)_2$: 4 to 12 $CH_2$ units, cyclohexyl, naphthyl, norbornyl, norbornane-dimethyl, trimethyl-hexamethylene, $X_1$=meta-phenyl, para-phenyl, $(CH)_2$: 2 to 12 $CH_2$ units, cyclohexyl, naphthyl, norbornyl, norbornane-dimethyl, trimethyl-hexamethylene, $Y=(CH_2)$: 2 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis(cyclohexyl)ethane, bis(cyclohexyl)propane, $Y_1=(CH_2)$: 2 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis(cyclohexyl)ethane, bis(cyclohexyl)propane, $Z=(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, $Z_1=(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene and a=0 to 50 mol %, b=0 to 100 mol %, $a_1$=0 to 50 mol %, $b_1$=0 to 100 mol % and the sum $a+a_1+b+b_1$ provides 100 mol %, the sum $c+c_1$ provides 100 wt. %;

wt. % of a polyamide (I), including at least one chain selected from the group consisting of the formulas Ia and Ib:

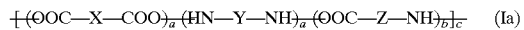 (Ia)

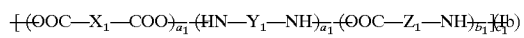 (Ib)

wherein

X=meta-phenyl, para-phenyl, $(CH_2)$: 4 to 12 $CH_2$ units, cyclohexyl, naphthyl, norbornyl, norbornane-dimethyl, trimethyl-hexamethylene, $X_1$=meta-phenyl, para-phenyl, $(CH_2)$: 2 to 12 $CH_2$ units, cyclohexyl, naphthyl, norbornyl, norbornane-dimethyl, trimethyl-hexamethylene, Y=$(CH_2)$: 2 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis(cyclohexyl)ethane, bis(cyclohexyl)propane, $Y_1$=$(CH_2)$: 2 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene, bis(cyclohexyl)methane, bis(cyclohexyl)ethane, bis(cyclohexyl)propane, Z=$(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, $Z_1$=$(CH_2)$: 4 to 12 $CH_2$ units, cyclohexyl, bis(methyl-cyclohexyl)methane, bis(methyl-cyclohexyl)ethane, bis(methyl-cyclohexyl)propane, norbornyl, norbornane-dimethyl, trimethyl-hexamethylene and a=0 to 50 mol %, b=0 to 100 mol %, $a_1$=0 to 50 mol %, $b_1$=0 to 100 mol % and the sum $a+a_1+b+b_1$ provides 100 mol %, the sum $c+c_1$ provides 100 wt. %;

99 to 1 wt. % of a partly crystalline polyamide (II), including at least one chain selected from the group consisting of formulas IIa and IIb:

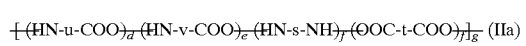 (IIa)

 (IIb)

wherein u=$(CH_2)$: 4 to 12 $CH_2$ units, v=$(CH_2)$: 4 to 12 $CH_2$ units, s, $s_1$=$(CH_2)$: 2 to 12 $CH_2$ units, meta-phenyl, para-phenyl, t, $t_1$=$(CH_2)$: 2 to 12 $CH_2$ units, meta-phenyl, para-phenyl and f=0 to 50 mol %, d=0 to 100 mol %

$f_1$=0 to 50 mol %, e=0 to 100 mol %, where the sum $f+f_1+d+e$ provides 100 mol % and the sum $g+g_1$ provides 100 weight %; and at least 0.01 parts by weight, based on 100 parts by weight of the polyamides of formulas Ia/Ib, IIa/IIb, of at least one phosphorus compound, chosen from the group consisting of a phosphorous compound according to formula III:

 (III)

99 to 1 wt. % of a partly crystalline polyamide (II), including at least one chain selected from the group consisting of formulas IIa and IIb:

 (IIa)

 (IIb)

wherein u=$(CH_2)$: 4 to 12 $CH_2$ units, v=$(CH_2)$: 4 to 12 $CH_2$ units, s, $s_1$=$(CH_2)$: 2 to 12 $CH_2$ units, meta-phenyl, para-phenyl, t, $t_1$=$(CH_2)$: 2 to 12 $CH_2$ units, meta-phenyl, para-phenyl and f=0 to 50 mol %, d=0 to 100 mol %

$f_1$=0 to 50 mol %, e=0 to 100 mol %, where the sum $f+f_1+d+e$ provides 100 mol % and the sum $g+g_1$ provides 100 weight %; and at least 0.01 parts by weight, based on 100 parts by weight of the polyamides of formulas Ia/Ib, IIa/IIb, of at least one phosphorus compound, chosen from the group consisting of a phosphorous compound according to formula III:

[X(R')$_n$P(O)$_l$(OR'')$_m$] (III)

wherein

X=H, —OR'', 2-pyridyl, —NH$_2$, —NHR', —NR'R'' where X can be bonded to (R') or directly to P, R'=$(CH_2)_{n_1}$ linear or branched, R''=Li, Na, K, H, $(CH_2)_{n_2}$ linear or branched, and n=integer between 0 and 5; l=0, 1, 1.5, 2, 2.5; m=integer between 0 and 3, $n_1$=integer between 1 and 12, $n_2$=1 to 12, and cyclic phosphonic acid anhydride compounds according to formula (IV),

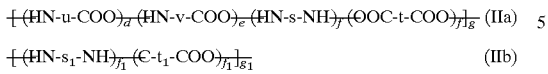 (IV)

wherein n=3, 4, 5, 6, is an alternating —P—O— heterocycle with 3, 4, 5, 6 (P—O) units in the ring, R=CH$_3$, C$_2$H$_5$, C$_3$H$_7$, C$_4$H$_9$, isobutyl, 2,2,6,6-tetramethyl-4-piperidyl;

producing a flowable mixture from a polymer melt of the blend components at a temperature of 250° C. or higher; and subjecting the mixture to a shear stress of more than 10 s$^{-1}$ while applying extrusion temperatures with resulting mold temperatures between 250 and 330° C.

12. The process of claim 11 wherein the phosphorous compound is an aqueous solution.

13. The process of claim 11 wherein the phosphorous compound is pure.

14. The process of claim 11 wherein polyamide (I) comprises 10 to 90 weight % of the composition.

15. The process of claim 11 wherein polyamide (II) comprises 10 to 90 weight % of the composition.

16. The process of claim 11 wherein phosphorous composition (III) comprises 0.01 to 2.0 parts by weight, based on 100 parts by weight of polyamides Ia/Ib and IIa/IIb.

17. The process of claim 11 wherein phosphorous composition (IV) comprises 0.01 to 15.0 parts by weight, based on 100 parts by weight of polyamides Ia/Ib and IIa/IIb.

18. A product formulated from a plastic material made from a polymer composition having the composition 1 to 99 wherein

X=H, —OR", 2-pyridyl, —NH$_2$, —NHR', —NR'R" where X can be bonded to (R') or directly to P, R'=(CH$_2$)$_{n_1}$ linear or branched, R"=Li, Na, K, H, (CH$_2$)$_{n_2}$ linear or branched, and n=integer between 0 and 5; l=0, 1, 1.5, 2, 2.5; m=integer between 0 and 3, n$_1$=integer between 1 and 12, n$_2$=1 to 12, and cyclic phosphonic acid anhydride compounds according to formula (IV), $$\text{—[(R)PO(O)]}_n\text{—} \tag{IV}$$

wherein n=3, 4, 5, 6, is an alternating —P—O— heterocycle with 3, 4, 5, 6 (P—O) units in the ring, R=CH$_3$, C$_2$H$_5$, C$_3$H$_7$, C$_4$H$_9$, isobutyl, 2,2,6,6-tetramethyl-4-piperidyl.

19. The product of claim 18 wherein the product is produced by injection molding.

20. The product of claim 18 wherein the product is formulated into a structure chosen from the group consisting of: spectacles, lenses, lamps, mirrors, panes, sight glasses, optical components, fittings, bottles, containers, medical, cosmetic, and hygiene articles, tooth-brushes, handles, packagings, fashion jewelry, backing films, laminated films, coextruded films, plates, semifinished goods, cylindrical preforms, optical wave guides, optical fibers, cable sheathing and conduits, protective coatings, varnishes and coatings for wires, grids, baskets, metal sheet, magnetic coils and deflection coils.

* * * * *

UNITED STATES PATENT AND TRADEMARK OFFICE
CERTIFICATE OF CORRECTION

PATENT NO. : 6,528,560 B2  
APPLICATION NO. : 09/796907  
DATED : March 4, 2003  
INVENTOR(S) : Friedrich Severin Bühler Page 1 of 1

It is certified that error appears in the above-identified patent and that said Letters Patent is hereby corrected as shown below:

In Claim 1, column 11, line 24, change "$[(HN\text{-}s_1\text{-}NH)_{11}(C\text{-}t_1\text{-}COO)_{11}]_{g1}$" to -- $[(HN\text{-}s_1\text{-}NH)_{11}(OOC\text{-}t_1\text{-}COO)_{11}]_{g1}$ --.

In Claim 11, column 13, line 6, change "$[(HN\text{-}s_1\text{-}NH)_{11}(C\text{-}t_1\text{-}COO)_{11}]_{g1}$" to -- $[(HN\text{-}s_1\text{-}NH)_{11}(OOC\text{-}t_1\text{-}COO)_{11}]_{g1}$ --.

In Claim 18, column 14, line 48, change "$[(HN\text{-}s_1\text{-}NH)_{11}(C\text{-}t_1\text{-}COO)_{11}]_{g1}$" to -- $[(HN\text{-}s_1\text{-}NH)_{11}(OOC\text{-}t_1\text{-}COO)_{11}]_{g1}$ --.

Signed and Sealed this

Thirtieth Day of October, 2007

JON W. DUDAS  
*Director of the United States Patent and Trademark Office*